Aug. 23, 1927.
F. E. MILLER
1,640,005
CONDIMENT SHAKER
Filed Feb. 12, 1927
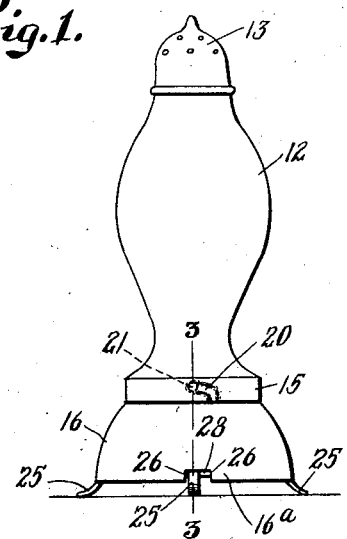
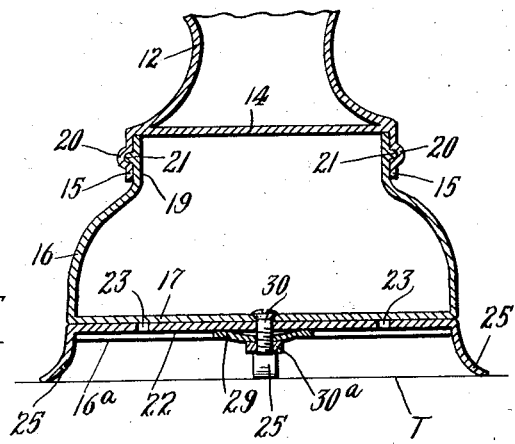
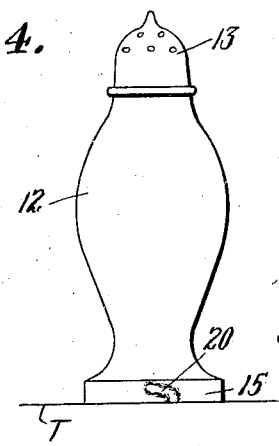
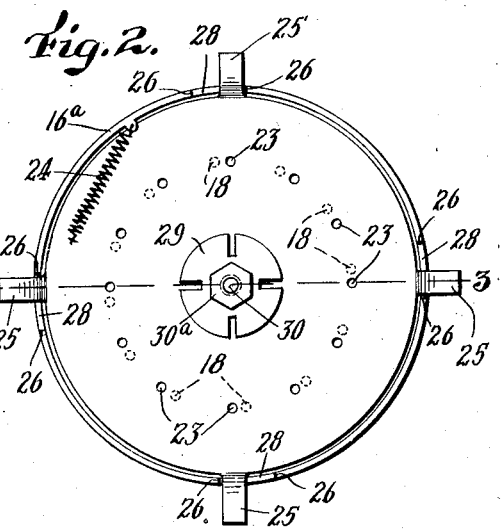
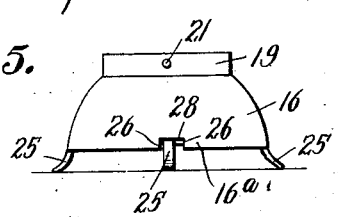
Inventor
F. E. Miller Patented Aug. 23, 1927.

1,640,005

UNITED STATES PATENT OFFICE.

FRANK E. MILLER, OF BOSTON, MASSACHUSETTS.

CONDIMENT SHAKER.

Application filed February 12, 1927. Serial No. 167,718.

The chief object of this invention is to provide a condiment shaker composed of two receptacles separably connected and including an upper receptacle having a perforated dispensing top and elsewhere closed, so that the receptacle is adapted to hold and dispense a given condiment, such as salt, and a lower receptacle having a dispensing bottom, a valve therefor, and an open filling mouth, the lower receptacle being adapted to hold and dispense a different condiment, such as pepper, the upper receptacle constituting a closure for the filling mouth of the lower receptacle, and the latter constituting a base whereby the two-part shaker may be supported on a table.

Another object is to enable the upper receptacle to stand upright on its own bottom, when separated from the lower receptacle.

Of the accompanying drawings forming a part of this specification,—

Figure 1 is a side view of a two-part condiment shaker embodying the invention.

Figure 2 is an enlarged end view of the same.

Figure 3 is a section on line 3—3 of Figures 1 and 2.

Figures 4 and 5 are side views, showing the two receptacles separately.

The same reference characters indicate the same parts in all of the figures.

My improved shaker includes an upper receptacle composed of a body portion 12, a perforated dispensing top 13, which may be a cap screwed or otherwise detachably secured to the body portion and closing a filling opening therein, a closed bottom 14 (Figure 3), and an annular base flange 15, projecting downwardly from the bottom.

The shaker includes also a lower receptacle, composed of a body portion 16, a dispensing perforated bottom 17 (Figure 3), the perforations 18 of which are shown by dotted lines in Figure 2, and an annular mouth 19, forming an open top and adapted to fit the base flange 16, as shown by Figure 3.

The mouth 19 and base flange 16 are provided with complemental coupling members, whereby the receptacles may be separably connected, so that the bottom 14 and the base flange 16, constitute a closure for the mouth 19. Said members are preferably embodied in angular bosses 20, formed on the base flange, and studs 21, fixed to the mouth 19, and entering the bosses, said studs and bosses constituting bayonet joints.

22 designates a perforated valve plate, pivoted to the bottom 17, the orifices 23 of the valve plate being shown by full lines in Figure 2. The arrangement is such that when the valve plate is in the position shown by Figure 2, it closes the orifices 18 of the perforated bottom, and when the valve plate is turned slightly from said position, its orifices 23 register with the orifices 18, so that a condiment in the lower receptacle may be dispensed. The valve plate may be held normally in its closed position by a spring 24, connecting the plate with the lower edge 16ª of the body 16, said edge preferably projecting below the valve plate. I provide the valve plate with outwardly projecting ears 25, arranged to be moved by the operator. To limit the turning movements of the valve plate, I provide the lower receptacle with stops 26, which are preferably the ends of recesses 28, formed in the edge portion 16ª the arrangement being such that the valve plate is movable in one direction only far enough to close the orifices 18, and in the opposite direction only far enough to open said orifices.

The ears 25 are preferably curved downwardly from the valve plate, so that they constitute feet adapted to rest on a table T, and support the lower receptacle raised above the table.

To ensure close contact of the valve plate 22 with the perforated bottom 17, I provide a spring washer 29, engaged with a pivot 30, which connects the valve plate with the bottom and exerts an upward pressure on the valve plate, said pivot having a shoulder 30ª supporting the washer.

The two receptacles may have any desired form, and may be of any suitable material, a ductile metal adapted to be formed by a spinning operation, or otherwise, being suitable, although any other suitable material may be employed.

The base flange 15 of the upper receptacle is formed to rest on a table top T, and support said receptacle in an upright position, as shown by Figure 4, so that it may be used independently of the lower receptacle, if desired.

I claim:

A condiment shaker composed of an upper receptacle having a perforated dispensing top and elsewhere closed, said receptacle including a closed bottom and a base flange projecting downwardly therefrom, and formed to support the receptacle in an upright position, and a lower receptacle having a perforated dispensing bottom and an annular mouth forming an open top, and adapted to fit the base flange of the upper receptacle, said base flange and mouth being provided with complemental coupling members, whereby the receptacles may be separably connected, so that the bottom and base flange of the upper receptacle constitute a closure for the mouth of the lower receptacle, the latter having a perforated valve plate pivoted to its bottom and movable to a position closing the dispensing perforations, the perforations in the valve plate being arranged to register with those of the lower receptacle bottom when the valve plate is moved from the closing position, the valve plate being provided with outwardly projecting ears whereby it may be turned, and the lower receptacle with stops cooperating with said ears in limiting the turning movements of the valve plate, said ears projecting downwardly from the plate and constituting feet adapted to support the lower receptacle above a table on which said ears bear.

In testimony whereof I have affixed my signature.

FRANK E. MILLER.